United States Patent Office 3,010,979
Patented Nov. 28, 1961

---

3,010,979
CHEMICAL PROCESS AND PRODUCT
Hugh E. Ramsden, Scotch Plains, N.J., assignor to Metal & Thermit Corporation, Woodbridge Township, N.J., a corporation of New Jersey
No Drawing. Filed July 12, 1957, Ser. No. 671,378
8 Claims. (Cl. 260—429.7)

The present invention relates to a process for producing aryltin compounds. It has now been discovered that aryltin compounds can be prepared by a novel, efficient and economical chemical process. This application is a continuation-in-part of Serial No. 549,571, filed November 28, 1955, which in turn was a continuation-in-part of Serial No. 520,145, filed July 5, 1955, both now abandoned.

It is an object of the present invention to provide a process for the production of aromatic substituted tin compounds.

Another object of the invention is to provide a novel process for producing aryltin compounds containing at least one aromatic carbon atom bonded to tin.

Still another object of the invention is to provide an efficient process for producing tetraaryltin compounds.

Other objects and advantages of the process will be apparent from the following description and claims.

Generally speaking, the present invention provides a process for producing aryltin compounds of the general formula (1)     $R_rR_m'R_o''R_p'''SnX_{4-(r+m+o+p)}$ wherein $r$ has the value 1, 2, 3 or 4; $m$, $o$ and $p$ have a value of 0, 1, 2 or 3; $r+m+o+p$ is equal to 1, 2, 3 or 4; X is selected from the class consisting of chlorine, bromine, iodine and fluorine; and R is defined as:

(2)

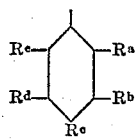

wherein $R^a$, $R^b$, $R^c$, $R^d$ and $R^e$ may be the same or different substituents as long as they do not react with the arylmagnesium chloride reagent employed in the present invention or other components of the reaction mixture and/or products under the process conditions. These substituents may be hydrogen; fluorine, chlorine; and substituted and unsubstituted organic groups, including alkyl, such as methyl, amyl, etc.; alkenyl, such as vinyl, allyl, propenyl, etc.; aryl, such as phenyl, naphthyl, tolyl, xylyl, xenyl, etc.; aralkyl, or aralkenyl such as benzyl, phenylethyl, cinnamyl, methylbenzyl, etc.; heterocyclic, such as thienyl, thenyl, furyl, etc.; alkoxy, such as methoxy, ethoxy, allyloxy, etc.; aryloxy, such as phenoxy, tolyloxy, xenyloxy, etc.; and dialkylamino, such as dimethylamino, diethylamino. The free bond shown in Formula 2 is bonded to an aromatic ring carbon and is further bonded to tin in Formula 1. $R^a$, $R^b$, $R^c$, $R^d$ or $R^e$ may also be polyvalent radicals whose free bonds are bonded together to form fused ring radicals. R', R" and R'" in Formula 1 above may have the value ascribed to R above or may be selected from the group consisting of alkyl, cycloalkyl, alkandiyl, cycloalkandiyl, alkenyl. alkadienyl, cycloalkenyl, alkynyl, cycloalkadienyl, aryl, aralkyl and active-hydrogen-free heterocyclic radicals. When R', R" or R'" are alkenyl or cycloalkenyl radicals the carbon atom bonded to tin does not carry an ethylenic unsaturated bond. More specifically R', R" and R'" may be alkyl radicals having up to 30 carbon atoms in the alkyl chain; aryl radicals having up to 3 rings in the aryl radical and no more than 48 carbon atoms in the radical; cycloalkyl radicals having up to 8 carbon atoms in the cycloalkyl ring; and heterocyclic radicals containing up to 3 rings in the radical and no more than 48 carbon atoms in the radical and containing as the heterocyclic atoms only elements selected from the class consisting of oxygen, sulfur and nitrogen. Moreover, any two of R', R" and R'" may be divalent aliphatic hydrocarbon radicals, the free valences of which are joined together to form a ring which contains tin.

In a preferred form of this invention R, R', R" and R'" in Formula 1 above are aryl radicals containing from 1 to 3 rings in the aryl radical, and up to 48 carbon atoms in the radical.

The present process for producing aromatic tin compounds comprises reacting substituted and unsubstituted aromatic magnesium chloride complexes with a tin halide such as an organotin halide or a tin tetrahalide, according to the following equation:

(3)     $rRMgCl \cdot nQ + R_m'R_o''R_p'''SnX_{4-(m+o+p)} \rightarrow$
$R_rR_m'R_o''R_p'''SnX_{4-(r+m+o+p)} + rMgX_2$ wherein X, R, R', R" and R'" are as defined above in connection with Formula 1; $r$ has the value 1, 2, 3 or 4; $m$, $o$ and $p$ have the value of zero, 1, 2 or 3; the sum of $m+o+p$ does not exceed 3; the sum of $r+m+o+p$ does not exceed 4. In one form of this invention, the Grignard reagent employed in Equation 3 is used in the form of a complex $RMgCl \cdot nQ$ wherein R is as defined above, $n$ is a small indeterminant number of the order of 1 to 3 and Q is as defined below.

An aspect of the present invention is illustrated by the following equation:

(4)     $RMgCl + SnX_4 \rightarrow R_4Sn + R_3SnX + R_2SnX_2 + RSnX_3 + MgX_2$ wherein $n$, R and X are as defined above in connection with Equation 3. The process may be controlled so that any of the aforementioned products or a mixture of products may be prepared. It is also possible to carry out the reaction stepwise by first reacting said arylmagnesium chloride with a tin reactant and then further reacting the product of this reaction with an organomagnesium chloride.

The arylmagnesium chloride complexes used in this process are prepared as disclosed in U.S. patent application Serial No. 549,560, now abandoned.

Compound Q referred to above is a substituted or unsubstituted non-aromatic heterocyclic oxygen compound having from 5 to 6 atoms in the heterocyclic ring, and only one oxygen in said heterocyclic ring. The other ring atoms of said heterocyclic ring are carbon with the exception that a substituted ring nitrogen, substituted preferably with an alkyl radical having up to 6 carbon atoms in the alkyl chain, may replace a carbon atom in said heterocyclic ring which is not adjacent said oxygen atom in the ring. A further requirement for compound Q is that said heterocyclic ring is of a non-aromatic character, that is, that it does not contain a cyclic conjugated system of bonding within the heterocyclic ring. Preferably, said compound Q contains not more than one unsaturaton between carbon atoms of said heterocyclic ring, which is an ethylenic unsaturation. A further requirement for compound Q is that it be unsubstituted, except for hydrogen, at at least one carbon atom which is adjacent said oxygen atom in said heterocyclic ring. The heterocyclic ring of compound Q, may carry any substituents which are not reactive with the reactants and the reaction products, under the conditions of reaction, for the preparation of the aryl-magnesium chloride. By way of illustration the following substituents may be mentioned: alkyl, aryl, alkoxy, aryloxy, —CH$_2$OR" wherein R" is alkyl, preferably having up to 6 carbon atoms or —(CH$_2$—CH$_2$—O)$_x$R"' wherein $x$ is a whole number from 1 to 8 and R''' is alkyl, preferably having up to 6 carbon atoms;

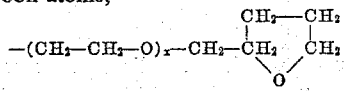

wherein $x$ is a whole number from 1 to 8; and

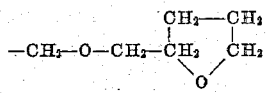

In a preferred form of this invention the substituents on said compound Q, aside from hydrogen, occur only at the number 2 position of said non-aromatic heterocyclic ring system and do not contain more than 75 atoms in the group.

Q may function as a solvent in this present process. If it is used as a solvent, a high melting point (e.g., about 90° C.) will cause difficulty in carying out the reaction. For this reason it is advantageous to use a liquid Q, i.e., liquid below 90° C.

It will be noted from the above that an essential feature of the compound Q is that it be non-aromatic in character. Another essential feature of compound Q is that it be free of substituents except for hydrogen, at at least one carbon atom which is adjacent the oxygen atom of the heterocyclic ring. These features are essential in order to make the free p-electrons on said oxygen atom available for coordination and complex formation with magnesium. The presence of substituents, aside from hydrogen, on both carbon atoms adjacent the oxygen atom of said heterocyclic ring restricts the availability of the free $p$-electrons of said oxygen for donation and complex formation, whereas a substituent on only one of said carbon atoms does not. The presence of substituents in other positions on the heterocyclic ring do not affect the availability of electrons on said oxygen for coordination and complex formation. The free $p$-electrons on oxygen atoms which constitute part of a heterocyclic ring system possessing *aromatic* characteristics are also not available for coordination and complex formation. The "aromaticity" of certain heterocyclic compounds is a well known phenomenon. This phenomenon is associated with the cyclic conjugated system of bonding which is characteristic of these heterocyclic compounds. Thus, furan, which is known to be aromatic in character, is not operative as a compound Q, whereas dihydropyran, which contains a single unsaturated bond is operative as a compound Q for the purposes of this invention. This is explained on the basis of the resonance of the respective compounds. Furan exhibits a p-pi *aromatic* resonance as a result of which the electron distribution is such that the free $p$-electrons of the oxygen atom are not available for coordination and complex formation. Dihydropyran, on the other hand exhibits only *an ethylenic p-pi* resonance in which the free $p$-electrons are still available for coordination and complex formation thus rendering it operative for the present purpose.

By way of illustration heterocyclic oxygen compounds included within the definition of compound Q are as follows: tetrahydrofuran, tetrahydropyran, 2-methyltetrahydrofuran, 2-ethoxytetrahydropyran, tetrahydrofurfuryl ethyl ether, dihydropyran, N-methylmorpholine, ditetrahydrofurfuryl ether and ethers of general formula

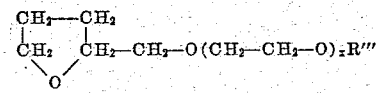

wherein R''' is an alkyl group having from 1 to 6 carbon atoms in the alkyl radical or the group

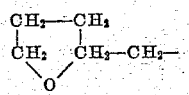

and $x$ is a whole number from 1 to 8.

When the aromatic magnesium chloride complex is reacted with the tin reactant, the product may be any of the type compounds listed hereinbefore as products, or any mixture of them depending upon the reactants used, the relative proportions of the products used, and the process conditions. By control of the process variables, it is possible to produce a product containing a preponderance of a desired reaction product. Thus, when an excess of $RMgCl \cdot nQ$ is reacted with $SnX_4$, the desired product would be $R_4Sn$.

In all of the halogen in the tin reactant is to be replaced, the tin containing reactant is added to the aromatic magnesium chloride-complex, usually dissolved in excess compound Q. If a substituted tin halide is desired, the organomagnesium chloride-complex is preferably added to the tin-containing reactant dissolved in an inert solvent. The reaction is preferably agitated. The reaction temperature will vary with the reactants and solvents utilized and the products desired, and will usually be between room temperature and the reflux temperature of the reaction mixture. The reaction is exothermic. For special conditions, it may be desirable and/or necessary to carry the reaction out, at low temperatures, or under reduced pressures. The reaction is preferably carried out in an inert atmosphere, usually nitrogen. The reactants and solvents are also preferably prepared in an inert atmosphere. The reaction products include one or more tin compounds, the magnesium halide salt, compound Q, and solvent if used. These may be separated by conventional means, e.g., hydrolysis, solvent extraction, filtration and distillation. The solvent is easily distilled off. The desired reaction product is usually distilled at reduced pressure.

In a preferred form of this invention the aryl-magnesium chloride complex is employed in the form of a solution in compound Q. This is preferred since this reagent may be readily and economically prepared by the reaction of the aryl chloride with magnesium in the presence of compound Q. The solution thus prepared may be used as a reactant in the present process. However, said aryl-magnesium chloride complex may also be used in other inert solvents e.g., ethylene polyethers, or aliphatic, cyclo-aliphatic or aromatic hydrocarbon solvents e.g., heptane, cyclohexane, toluene, hexane, pentane, octane, isooctane, cumene, xylene, etc. A mixture of said inert solvents and a compound Q also form an advantageous reaction medium for carrying out the process of this invention. The tin reactants employed in this invention may be introduced into the reaction mixture as such or dissolved in a suitable solvent such as a compound Q or one of the other inert solvents mentioned above.

If a solvent is utilized, it must be inert to the other components of the reaction mixture under the process conditions and is preferably an organic solvent that distills below 150° C. The preferred solvents include substituted and unsubstituted tetrahydrofuran, tetrahydropyran, heptane, hexane, pentane, octane, isoctane, cumene, xylene, etc. A solvent system containing more than one component may also be used.

$RMgCl \cdot nQ$ complexes in which Q is tetrahydrofuran are especially preferred. This compound is commercially available, relatively inexpensive and such complexes, when utilized in this process, provide excellent yields. For similar reasons the organotin chlorides and tin chlorides are preferred reactants.

The following examples are further illustrative of the present invention. It is to be understood, however, that this invention is not restricted thereto.

EXAMPLE NO. 1

$\phi_4Sn$ from $\phi SnCl_3$

Phenylmagnesium chloride - tetrahydrofuran complex was made by the reaction of 371 grams (3.3 moles) of chlorobenzene with 80.3 (3.3 gram atoms) of magnesium in tetrahydrofuran medium. To this was added, over about one hour, 282 grams (1 mole) of phenyltin trichloride, the mix being stirred mechanically meanwhile. The reaction was exothermic and the temperature rose rapidly to about 83°, which was then maintained by reflux. About 300 ml. of toluene were added during the reaction to reduce the viscosity. After an additional hour of refluxing, the batch was cooled slightly and then poured into a large volume of distilled water. Crude tetraphenyl tin precipitated out and was separated by filtration. An organic phase separated from the water solution also contained some tetraphenyltin which was recovered by stripping off the solvent. Total yield of crude tetraphenyltin was 393 grams or 92%. By recrystallization from hot xylene a purified product containing 27.5% tin and 0.54% chlorine was produced.

EXAMPLE NO. 2

*ϕ₄Sn from SnCl₄*

Phenylmagnesium chloride - tetrahydrofuran complex was made by the reaction of 60.8 grams (2.5 gram atoms) of magnesium and 281 grams (2.5 moles) of chlorobenzene in 541 grams of tetrahydrofuran. Protected by an atmosphere of nitrogen, the solution so formed was fed, over 1½ hours, into a flask containing a solution of 130.3 grams (0.5 mole) of stannic chloride in 2000 ml. of petroleum solvent (chiefly heptane and octane). A nitrogen atmosphere was maintained in the dropping funnel and in the reaction flask. External heat was used to keep the reaction mixture at about 90° C. (refluxing) during the addition and for about 5 hours thereafter. The mix was then poured into a large volume of water. Two liquid and a solid phase appeared. The solid phase, which was crude tetraphenyl tin, was filtered out. To this was added more tetraphenyl tin recovered by stripping solvent from the organic liquid phase. The total crude tetraphenyl tin amounted to 204 grams representing a 95% yield. By recrystallization from xylene a purified product was prepared which had a melting point of 224–226° C. and which contained 27.7% Sn and only a trace of chlorine.

EXAMPLE NO. 3

*Phenyltin trichloride*

$(C_6H_5)SnCl_3$

One mole of phenylmagnesium chloride-tetrahydrofuran complex is prepared and this is added, over a period of about one hour, to 1 mole of tin tetrachloride in tetrahydrofuran. The mixture is stirred during the addition. The exothermic reaction maintains itself spontaneously at reflux during the addition. Toluene is added during the addition from time to time to reduce the viscosity. After the addition is completed, refluxing is continued for an hour, the mixture is cooled slightly and then poured into a large volume of water. The product separates out and is collected by decantation. Purification is effected by vacuum distillation.

EXAMPLE NO. 4

*Diphenyltin dichloride*

$(C_6H_5)_2SnCl_2$

This product is prepared by following the procedure in Example No. 3, except that a ratio of 2 moles of phenylmagnesium chloride to 1 mole of tin tetrachloride is used.

EXAMPLE NO. 5

*Triphenyltin chloride*

$(C_6H_5)_3SnCl$

This product is prepared by following the procedure in Example No. 3, except that a ratio of 3 moles of phenylmagnesium chloride to 1 mole of tin tetrachloride is used.

EXAMPLE NO. 6

*p-Chlorophenyltin trichloride*

$(p\text{-}ClC_6H_4)SnCl_3$

This product is prepared by following the procedure in Example No. 3, except that 1 mole of p-chlorophenylmagnesium chloride is used.

EXAMPLE NO. 7

*Diphenyl di-p-tolyltin*

A mixture of 2.77 moles phenylmagnesium chloride-tetrahydrofuran complex and 2.77 moles p-tolyl magnesium chloride-tetrahydrofuran complex was prepared by reacting a mixture of 2.77 moles chlorobenzene and 2.77 moles p-chlorotoluene with 5.6 grams atoms of magnesium in tetrahydrofuran medium. The reaction was initiated by 1 ml. of ethyl bromide, the mix being added over a 3 hour period. The mixture was kept refluxing during the addition and for an hour thereafter.

The solution thus formed was fed over a 5 hour period to a solution of 1.2 moles stannic chloride in 1500 ml. of toluene, with good stirring. The reaction mixture was then refluxed for two hours.

After standing overnight, the mixture was poured into 3 liters of water, two liquid layers resulting. The organic layer was filtered and stripped of most of the solvent. Then 750 ml. of methanol were added which causes precipitation of crude diphenyldi-p-tolyltin. Further quantities were recovered from the mother liquor to being the total crude yield to 90%. A somewhat purified product was recovered by recrystallization; this melted 133–135° C.

EXAMPLE NO. 8

A solution of 1 mole of phenyltin trichloride in 1 liter of hydrocarbon solvent (heptane-octane) was placed in a 2 liter 3 neck flask equipped with a stirrer, a dropping funnel and a reflux condenser. A solution of 1.1 moles of phenylmagnesium chloride tetrahydrofuran complex in tetrahydrofuran was added dropwise. The mixture was kept as reflux an additional 3 hours. After cooling, the reaction mixture was quenched in water slightly acidified with HCl. Diphenyltin dichloride in about 35% yield was distilled from the reaction mixture which also contained triphenyltin chloride and tetraphenyltin.

EXAMPLE NO. 9

$Bu_2\phi_2Sn$

Phenylmagnesium chloride-tetrahydrofuran complex was prepared by the reaction of 97 grams (4 gram atoms) of magnesium with 448 grams (4 moles) of chlorobenzene in tetrahydrofuran medium (852 grams). To this solution, at reflux temperature (84° C.) was added, over about ½ hour, a solution of 545 gram dibutyltin dichloride (1.8 moles) dissolved in 1800 ml. of xylene. Refluxing at 102° C. was continued for an additional 4 hours. Some of the solvents were removed by distillation and then the reaction slurry was fed into a solution of 50 grams of concentrated hydrochloric acid in 1600 ml. water. Heat of reaction caused some low boiling materials to distill off. Two liquid phases were formed. From the organic phase there was recovered dibutyldiphenyltin as a fraction boiling at 164° C./2 mm. It contained 30.3% tin, 0.27% chloride (theory 30.7% Sn). Yield was 77%.

EXAMPLE NO. 10

*p-Chlorophenyltributyltin* p-Chlorophenylmagnesium chloride - tetrahydrofuran complex was prepared by the reaction of 24.3 grams of magnesium (1 gram atom) with 147 grams (1 mole) of p-dichlorobenzene in tetrahydrofuran medium. The reaction was carried out at about 78° C. in an atmosphere of nitrogen. To the reaction product was added, over a 4½ hour period, 351 grams of tributyltin chloride (90% pure). Stirring was continued for an additional 4 hours, the temperature being held at about 65° C. The product was then treated with dilute sulfuric acid to dissolve the magnesium chloride formed. The organic portion of the product was distilled under vacuum and 265 grams of main product was recovered. This contained 8.85% chloride, 30.7% tin and was identified as p-chlorophenyltributyltin. (Theory 29.5% Sn; 8.9% Cl.)

EXAMPLE NO. 11

*Di-p-chlorophenyltin dichloride*

$(p\text{-}ClC_6H_4)_2SnCl_2$

Two moles of p-chlorophenylmagnesium chloride-tetrahydrofuran complex in tetrahydrofuran is prepared. This is slowly added to 1 mole of stannic chloride dissolved in heptane, at such a rate and with heat being supplied when necessary to maintain reflux during the period of addition and for an hour afterwards. The resulting mixture is kept at reflux and stirred for an additional hour and then added to water to dissolve the MgCl₂ salt which forms. The organic layer is separated from the water layer. The organic layer is filtered and the solvents are removed by distillation in vacuo. The product which forms is separated and purified by vacuum distillation.

EXAMPLE NO. 12

*Tri-p-chlorophenyltin chloride*

$(p\text{-}ClC_6H_4)_3SnCl$

This product is prepared by following the procedure in Example No. 11, except that a ratio of 3 moles of p-the Grignard formed from p-dichlorobenzene to 1 mole of tin tetrachloride is used. The product is purified by recrystallization from xylene.

EXAMPLE NO. 13

*Tetra-p-chlorophenyltin*

$(p\text{-}ClC_6H_4)_4Sn$

This product is prepared by following the procedure in Example No. 11, except that a ratio of 4 moles of the Grignard formed p-dichlorobenzene to 1 mole of tin tetrachloride is used. The product is purified by recrystallization from xylene.

EXAMPLE NO. 14

*o-Tolyltin trichloride*

$(o\text{-}CH_3C_6H_4)SnCl_3$

This product is prepared by following the procedure in Example No. 11, except that a ratio of 1 mole of o-tolylmagnesium chloride to 1 mole of tin tetrachloride is used.

EXAMPLE NO. 15

*Di-o-tolyltin dichloride*

$(o\text{-}CH_3C_6H_4)_2SnCl_2$

This product is prepared by following the procedure in Example No. 11, except that a ratio of 2 moles of o-tolylmagnesium chloride to 1 mole of tin tetrachloride is used.

EXAMPLE NO. 16

*Tri-o-tolyltin chloride*

$(o\text{-}CH_3C_6H_4)_3SnCl$

This product is prepared by following the procedure in Example No. 11, except that a ratio of 3 moles of o-tolylmagnesium chloride to 1 mole of tin tetrachloride is used.

EXAMPLE NO. 17

*Tetra-o-tolyltin*

$(o\text{-}CH_3C_6H_4)_4Sn$

This product is prepared by following the procedure in Example No. 11, except that a ratio of 4 moles of o-tolylmagnesium chloride to 1 mole of tin tetrachloride is used. The product is purified by recrystallization from xylene.

EXAMPLE NO. 18

*p-anisyltin trichloride*

$(p\text{-}CH_3OC_6H_4)SnCl_3$

This product is prepared by following the procedure in Example No. 11 making use of 1 mole of p-anisylmagnesium chloride to 1 mole of tin tetrachloride.

EXAMPLE NO. 19

*Di-p-anisyltin dichloride*

$(p\text{-}CH_3OC_6H_4)_2SnCl_2$

This product is prepared by following the procedure in Example No. 11, except that 2 moles of p-anisylmagnesium chloride is used.

EXAMPLE NO. 20

*Tri-p-anisyltin chloride*

$(p\text{-}CH_3OC_6H_4)_3SnCl$

This product is prepared by following the procedure in Example No. 11, except that a ratio of 3 moles of p-anisylmagnesium chloride to 1 mole of tin tetrachloride is used.

EXAMPLE NO. 21

*Tetra-p-anisyltin*

$(p\text{-}CH_3OC_6H_4)_4Sn$

This product is prepared by following the procedure in Example No. 2, except that the Grignard formed from p-chloranisole is used.

EXAMPLE NO. 22

*Trichlorobiphenylyltin trichloride*

$(Trichlorobiphenylyl)SnCl_3$

This product is prepared by following the procedure in Example No. 11, except that a ratio of 1 mole of trichlorobiphenylylmagnesium chloride to 1 mole of tin tetrachloride is used. The product is purified by molecular distillation.

EXAMPLE NO. 23

*Ditrichlorobiphenylyltin dichloride*

$(Trichlorobiphenylyl)_2SnCl_2$

This product is prepared by following the procedure in Example No. 11, except that a ratio of 2 moles of trichlorobiphenylylmagnesium chloride to 1 mole of tin tetrachloride is used. The product is purified by distillation in a molecular still.

EXAMPLE NO. 24

*Tritrichlorobiphenylyltin chloride*

$(Trichlorobiphenylyl)_3SnCl$

This product is prepared by following the procedure in Example No. 11, except that a ratio of 3 moles of trichlorobiphenylylmagnesium chloride to 1 mole of tin tetrachloride is used. The product is purified by distillation in a molecular still.

EXAMPLE NO. 25

*Tetratrichlorobiphenylyltin*

$(Trichlorobiphenylyl)_4Sn$

This product is prepared by following the procedure in Example No. 2, except that 4 moles of trichlorobiphenylylmagnesium chloride is used.

EXAMPLE NO. 26

*p-Dimethylaminophenyltin trichloride*

[p-(CH$_3$)$_2$NC$_6$H$_4$]SnCl$_3$

This product is prepared by following the procedure in Example No. 11, except that a ratio of 1 mole of p-dimethylaminophenylmagnesium chloride to 1 mole of tin tetrachloride is used. The product is purified by vacuum distillation.

EXAMPLE NO. 27

*Di-p-dimethylaminophenyltin dichloride*

[p-(CH$_3$)$_2$NC$_6$H$_4$]$_2$SnCl$_2$

This product is prepared by following the procedure in Example No. 11, except that a ratio of 2 moles of the Grignard formed from p-dimethylaminochlorobenzene to 1 mole of tin tetrachloride is used. The product is purified by vacuum distillation.

EXAMPLE NO. 28

*Tri-p-dimethylaminophenyltin chloride*

[p-(CH$_3$)$_2$NC$_6$H$_4$]$_3$SnCl

This product is prepared by following the procedure in Example No. 11, except that a ratio of 3 moles of p-dimethylaminophenylmagnesium chloride to 1 mole of tin tetrachloride is used. The product is purified by vacuum distillation.

EXAMPLE NO. 29

*Tetra-p-dimethylaminophenyltin*

[p-(CH$_3$)$_2$NC$_6$H$_4$]$_4$Sn

This product is prepared by following the procedure in Example No. 2, except that the Grignard formed from p-dimethylaminochlorobenzene is used.

EXAMPLE NO. 30

*Triphenylbutyltin*

(C$_6$H$_5$)$_3$(C$_4$H$_9$)Sn

This product is prepared by following the procedure in Example No. 8, except that 3 moles of phenylmagnesium chloride and 1 mole of butyltin trichloride are used.

EXAMPLE NO. 31

*Diphenylbutyltin chloride*

(C$_6$H$_5$)$_2$(C$_4$H$_9$)SnCl

This product is prepared by following the procedure in Example No. 11, except that 2 moles of phenylmagnesium chloride and 1 mole of butyltin trichloride are used.

EXAMPLE NO. 32

*Phenylbutyltin dichloride*

(C$_6$H$_5$)(C$_4$H$_9$)SnCl$_2$

This product is prepared as in Example No. 11, except that 1 mole of phenylmagnesium chloride and 1 mole of butyltin trichloride are used.

EXAMPLE NO. 33

*Phenyldibutyltin chloride*

(C$_6$H$_5$)(C$_4$H$_9$)$_2$SnCl

This product is prepared by following the procedure in Example No. 11, except that 1 mole of phenylmagnesium chloride and 1 mole of dibutyltin dichloride are used.

EXAMPLE NO. 34

*Phenyltributyltin*

(C$_6$H$_5$)(C$_4$H$_9$)$_3$Sn

This product is prepared by following the procedure in Example No. 11, except that 1 mole of phenylmagnesium chloride and 1 mole of tributyltin chloride are used.

EXAMPLE NO. 35

*Triphenylthienyltin*

(C$_6$H$_5$)$_3$(thienyl)Sn

This product is prepared by following the procedure in Example No. 11, except that 3 moles of phenylmagnesium chloride and 1 mole of thienyltin trichloride are used.

EXAMPLE NO. 36

*Diphenylthienyltin chloride*

(C$_6$H$_5$)$_2$(thienyl)SnCl

This product is prepared as in Example No. 11, except that 2 moles of phenylmagnesium chloride and 1 mole of thienyltin trichloride are used.

EXAMPLE NO. 37

*Phenylthienyltin dichloride*

(C$_6$H$_5$)(thienyl)SnCl$_2$

This product is prepared as in Example No. 11, except that 1 mole of phenylmagnesium chloride and 1 mole of thienyltin trichloride are used.

EXAMPLE NO. 38

*Diphenyldithienyltin*

(C$_6$H$_5$)$_2$(thienyl)$_2$Sn

This product is prepared by following the procedure in Example No. 11, except that 2 moles of phenylmagnesium chloride and 1 mole of dithienyltin dichloride are used.

EXAMPLE NO. 39

*Phenyldithienyltin chloride*

(C$_6$H$_5$)(thienyl)$_2$SnCl

This product is prepared as in Example No. 11, except that 1 mole of phenylmagnesium chloride and 1 mole of dithienyltin dichloride are used.

EXAMPLE NO. 40

*Phenyltrithienyltin*

(C$_6$H$_5$)(thienyl)$_3$Sn

This product is prepared by following the procedure in Example No. 11, except that 1 mole of phenylmagnesium chloride and 1 mole of trithienyltin chloride are used.

EXAMPLE NO. 41

*Tetra-p-vinylphenyltin*

(p-CH$_2$=CH—C$_6$H$_4$)$_4$Sn

This product is prepared by following the procedure in Example No. 2, except that the Grignard formed from p-vinylchlorobenzene is used.

EXAMPLE NO. 42

*Di-p-chlorophenylphenyltin chloride*

(p-ClC$_6$H$_4$)$_2$(C$_6$H$_5$)SnCl

This product is prepared by following the procedure in Example No. 8, except that a ratio of 2 moles of the Grignard formed from p-dichlorobenzene to 1 mole of phenyltin trichloride is used.

EXAMPLE NO. 43

*p-vinylphenylphenyltin dichloride*

(p-CH$_2$=CHC$_6$H$_5$)(C$_6$H$_5$)SnCl$_2$

This product is prepared by following the procedure in Example No. 8, except that 1 mole of the Grignard formed from p-vinylchlorobenzene is used.

EXAMPLE NO. 44

*Dibiphenylyldiphenyltin*

[C₆H₅C₆H₄]₂[C₆H₅]₂Sn

A solution of 1 mole of diphenyltin dichloride in 1 liter of hydrocarbon solvent (heptane-octane) was placed in a 2 liter, 3 neck flask equipped with a stirrer, a dropping funnel and a reflux condenser. A solution of 2 moles of biphenylylmagnesium chloride in tetrahydrofuran was added dropwise. Then the mixture was kept at reflux for about an additional 3 hours. After cooling, the reaction mixture was quenched in water slightly acidified with HCl. The dibiphenylyldiphenyltin is recovered from the organic layer.

EXAMPLE NO. 45

*phenylmethyltin dichloride*

(C₆H₅)(CH₃)SnCl₂

A mixture containing 1 mole of phenylmagnesium chloride and 1 mole of methylmagnesium chloride is prepared in tetrahydrofuran. This mixture is added, dropwise, with vigorous stirring to a solution of tin tetrachloride dissolved in a hydrocarbon solvent (heptane-octane). During the addition and for 3 hours after the addition is complete, the mixture is kept at reflux. After cooling, the mixture is quenched in water. The organic layer which forms is separated, filtered and after removing the solvents the product is isolated from side products by rapid distillation.

EXAMPLE NO. 46

*Di-p-chlorophenyldidecyltin*

(p-ClC₆H₄)₂(decyl)₂Sn

This product is prepared by following the procedure in Example No. 45, except that a mixture containing 2 moles of p-chlorophenylmagnesium chloride and 2 moles of decylmagnesium chloride is reacted with 1 mole of tin tetrachloride.

EXAMPLE NO. 47

*Di-p-tolyllauryltin chloride*

(p-CH₃C₆H₄)₂(lauryl)SnCl

This product is prepared by following the procedure in Example No. 45, except that a mixture containing 2 moles of p-tolylmagnesium chloride and 1 mole of laurylmagnesium chloride is reacted with 1 mole of tin tetrachloride.

EXAMPLE NO. 48

*Phenyl-p-anisyltin dichloride*

(C₆H₅)(p-CH₃OC₆H₄)SnCl₂

This product is prepared by following the procedure in Example No. 45, except that a mixture containing 1 mole of phenylmagnesium chloride and 1 mole of p-anisylmagnesium chloride is reacted with 1 mole of tin tetrachloride.

EXAMPLE NO. 49

*Phenyl-p-chlorophenyl-p-vinylphenyltin chloride*

(C₆H₅)(p-ClC₆H₄)(p-CH₂=CHC₆H₄)SnCl

This product is prepared by following the procedure in Example No. 45, except that a mixture containing 1 mole of p-vinylphenylmagnesium chloride and 1 mole of p-chlorophenylmagnesium chloride is added to 1 mole of phenyltin trichloride.

EXAMPLE NO. 50

*Diphenyllauryltin chloride*

(C₆H₅)₂(lauryl)SnCl

This product is prepared by following the procedure in Example No. 45, except that a solution containing 1 mole of phenylmagnesium chloride and 1 mole of laurylmagnesium chloride is reacted with 1 mole of phenyltin trichloride.

EXAMPLE NO. 51

*Diphenylbenzyltin chloride*

(C₆H₅)₂(C₆H₅CH₂)SnCl

This product is prepared by following the procedure in Example No. 45 by reacting a solution containing 1 mole of benzylmagnesium chloride and 2 moles of phenylmagnesium chloride with 1 mole of tin tetrachloride.

EXAMPLE NO. 52

*Diphenyl-2-pyridyltin chloride*

(C₆H₅)₂(2-pyridyl)SnCl

This product is prepared by following the procedure in Example No. 45, except that a solution containing 2 moles of phenylmagnesium chloride and 1 mole of 2-pyridylmagnesium chloride is reacted with tin tetrachloride.

EXAMPLE NO. 53

*Diphenyldi-8-quinolyltin*

(C₆H₅)₂(8-quinolyl)₂Sn

This product is prepared by following the procedure in Example No. 45, except that a solution containing 2 moles of phenylmagnesium chloride and 2 moles of 8-quinolylmagnesium chloride is reacted with 1 mole of tin tetrachloride.

Compounds made in accordance with the present process have a wide variety of uses. These are useful as moth proofing agents and as stabilizers for polyvinyl chloride resins.

While the invention has been described with particular reference to specific embodiments, it is to be understood that it is not limited thereto but is to be construed broadly and restricted solely by the scope of the appended claims.

What is claimed is:

1. As a composition of matter, an organotin compound having the general formula $V_aSnZ_{4-a}$, wherein V is a vinylphenyl radical bonded to the tin atom through a carbon atom of the phenyl ring, Z is a member selected from the class consisting of hydrocarbon radicals and halogen atoms, and $a$ is an integer from 1 to 4.

2. As a composition of matter, tetra-vinylphenyltin.

3. A composition of matter according to claim 1 wherein Z is chlorine.

4. A composition of matter according to claim 1 wherein Z is bromine.

5. A composition of matter according to claim 1 wherein $a$ is 1.

6. A composition of matter according to claim 1 wherein $a$ is 2.

7. A composition of matter according to claim 1 wherein $a$ is 3.

8. A composition of matter according to claim 1 wherein the vinylphenyl radical is the p-vinylphenyl radical.

References Cited in the file of this patent

UNITED STATES PATENTS 2,675,399    Ramsden            Apr. 13, 1954

OTHER REFERENCES

Kharasch et al.: "Grignard Reaction of Nonmetallic Substances," 1954, pp. 24 and 50.

Normant: "Académie des Sciences, Comptes Rendus," vol. 239, No. 22, November 29, 1954 (pages 1511–12 relied on).

Razuvaev et al.: "The Reaction of Radical Cleavage from Completely Asymmetric Derivatives of Tin," Chemical Abstracts 46, 1479c (1952).